US008866458B2

(12) United States Patent
Ribarich

(10) Patent No.: US 8,866,458 B2
(45) Date of Patent: Oct. 21, 2014

(54) INTEGRATED HIGH-VOLTAGE POWER SUPPLY START-UP CIRCUIT

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 145 days.

(21) Appl. No.: 13/023,864

(22) Filed: Feb. 9, 2011

(65) Prior Publication Data

US 2012/0200275 A1     Aug. 9, 2012

(51) Int. Cl.
*H02M 1/36* (2007.01)
*H02M 3/156* (2006.01)

(52) U.S. Cl.
CPC .............. *H02M 1/36* (2013.01); *Y10S 323/901* (2013.01)
USPC ........................................... 323/282; 323/901

(58) Field of Classification Search
USPC ................. 323/223, 224, 282, 284, 288, 901; 363/49
See application file for complete search history.

(56) References Cited

U.S. PATENT DOCUMENTS

| 5,640,317 | A | 6/1997 | Lei |
| 5,818,214 | A * | 10/1998 | Pelly et al. ................... 323/351 |
| 6,788,039 | B2 * | 9/2004 | Abdoulin ...................... 323/288 |
| 7,193,396 | B2 * | 3/2007 | Orr ............................... 323/225 |
| 7,257,008 | B2 * | 8/2007 | Yang et al. ................. 363/21.12 |
| 7,619,450 | B2 * | 11/2009 | Grasso et al. ................. 327/143 |
| 2004/0183512 | A1 | 9/2004 | McCune |
| 2009/0279333 | A1 | 11/2009 | Zhu |
| 2010/0156372 | A1 | 6/2010 | Kobayashi |
| 2010/0259238 | A1 | 10/2010 | Cheng |

FOREIGN PATENT DOCUMENTS

JP         2007-195361         8/2007

* cited by examiner

*Primary Examiner* — Gary L Laxton
(74) *Attorney, Agent, or Firm* — Farjami & Farjami LLP

(57) ABSTRACT

An integrated start-up circuit for a power supply includes a converter, which in one implementation can be a buck converter. The buck converter includes a gate driver configured to drive a power switch, where the power switch is coupled across a DC bus node and a switching node of the buck converter. The power switch is configured to provide a start-up voltage to the buck converter from the DC bus node during start-up of the buck converter. The buck converter includes a bootstrap switch coupled across the gate driver and a Vcc node and a Schottky diode coupled across the bootstrap switch and the switching node, where the start-up voltage is provided at the Vcc node through the bootstrap switch.

16 Claims, 3 Drawing Sheets

INTEGRATED HIGH-VOLTAGE POWER SUPPLY START-UP CIRCUIT

BACKGROUND OF THE INVENTION

1. Field of the Invention

The present invention is generally in the field of electrical circuits. More particularly, the invention relates to power supply circuits.

2. Background Art

Power supplies, such as switch-mode power supplies, can convert and regulate power from AC mains to desired DC voltages suitable for powering a load connected across the power supply. Standards and regulations imposed on these power supplies have become and inevitably will continue to become more stringent. For example, standards and regulations have lowered maximum standby power limits for power supplies in order to curb energy consumption. Thus, it is desirable to reduce power consumption when a load is disconnected from the power supply or is not in use. In doing so, a connection to the AC mains should be preserved to, for example, provide a low-voltage supply voltage to start up the power supply's control circuitry.

One conventional approach is ensuring that the low-voltage supply voltage of the power supply consumes low current during start-up of power supply control circuitry while continuously supplying this low current with a fixed high-ohmic resistor from the AC mains. However, this approach can no longer comply with maximum standby power limits as the resistor is continuously dissipating power after start-up. Another conventional approach uses a high-voltage start-up circuit that can connect to the AC mains to supply current to the power supply control circuitry when required, while otherwise disconnecting and withstanding the high-voltage. However, this approach requires complex and costly start-up circuitry including an additional large high-voltage start-up switch.

Thus, there is a need in the art for an improved start-up circuit for power supplies that overcomes the drawbacks and deficiencies in the art.

SUMMARY OF THE INVENTION

An integrated high-voltage power supply start-up circuit, substantially as shown in and/or described in connection with at least one of the figures, and as set forth more completely in the claims.

DETAILED DESCRIPTION OF THE INVENTION

The present invention is directed to an integrated high-voltage power supply start-up circuit. The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
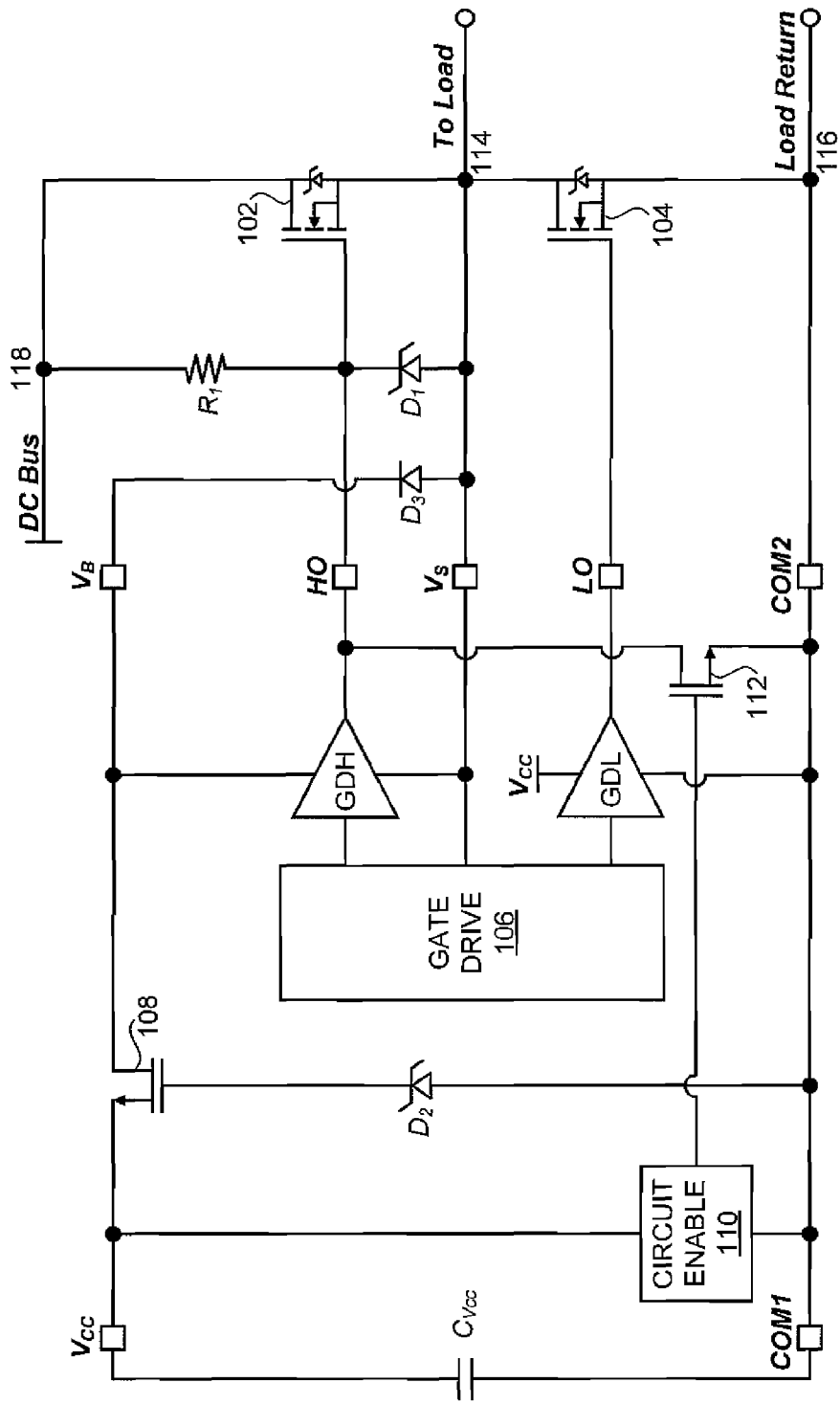
FIG. 1 illustrates an exemplary integrated high-voltage power supply start-up circuit, according to one embodiment of the invention.

FIG. 1 illustrates an exemplary integrated high-voltage power supply start-up circuit, according to one embodiment of the invention. Circuit 100 includes high-side switch 102, low-side switch 104, high-side gate driver GDH, low-side gate driver GDL, gate drive 106, bootstrap switch 108, enable circuit 110, enable switch 112, capacitor $C_{Vcc}$, resistor $R_1$, Zener diodes $D_1$ and $D_2$, and Schottky diode $D_3$. The embodiment shown in FIG. 1 comprises an integrated circuit having terminals nodes $V_B$, HO, $V_S$, LO, COM1, $V_{CC}$, and COM2. For example, all components to the left of nodes $V_B$, HO, $V_S$, LO, COM2 and to the right of nodes $V_{CC}$ and COM1 are in the integrated circuit. However, it will be appreciated that circuit 100 does not require an integrated circuit and can be realized using various configurations and components, such as, discrete components.

As shown in FIG. 1, circuit 100 comprises a buck converter, and more particularly, in the present embodiment, circuit 100 comprises a half-bridge or synchronous buck converter. As such, circuit 100 can supply converted and regulated power to a load connected across switching node 114 and node 116 (not shown in FIG. 1). Furthermore, circuit 100 can comprise an off-line power supply connected to, for example, AC mains (not shown in FIG. 1).

In the embodiment shown in FIG. 1, circuit 100 includes high-side switch 102 and low-side switch 104, which are high-voltage power switches. In FIG. 1, high-side switch 102 and low-side switch 104 comprise NMOS transistors and in some embodiments can comprise, for example, silicon transistors, GaN High Electron Mobility Transistors (HEMTs) or other group III-V transistors. FIG. 1 shows the drain of high-side switch 102 coupled to a DC bus at DC Bus node 118, the source of high-side switch 102 coupled to switching node 114, and the gate of high-side switch 102 coupled to high-side gate driver GDH. FIG. 1 further shows the drain of low-side switch 104 coupled to switching node 114, the source of low-side switch 104 coupled to node 116, and the gate of low-side switch 104 coupled to low-side gate driver GDL. Thus, high-side switch 102 and low-side switch 104 can be driven respectively by high-side gate driver GDH and low-side gate driver GDL, which are controlled by gate drive 106, to provide a switched voltage at switching node 114.

FIG. 1 also shows node $V_{cc}$, for providing a $V_{cc}$ voltage comprising a low-voltage supply voltage, which can power circuit 100. For example, high-side gate driver GDH can be coupled to $V_{cc}$ through bootstrap switch 108 to charge $V_B$ and low-side gate driver GDL can be coupled to $V_{cc}$. As a specific example, the $V_{cc}$ voltage can be around 20-30 volts. During regular operation, the $V_{cc}$ voltage can be provided to circuit 100 by an auxiliary supply, for example, an auxiliary winding of a transformer (not shown in FIG. 1). However, during start-up of circuit 100, the auxiliary supply is not available to circuit 100. Rather, circuit 100 is connected to DC Bus, which is a high-voltage supply from, for example, AC mains. Thus, circuit 100 includes high-voltage power supply start-up circuitry, which can be connected to DC Bus to provide a start-up voltage to node $V_{cc}$ during start-up of circuit 100.

Conventional power supplies can require a specialized high-voltage start-up switch and other complex start-up circuitry to provide a start-up voltage to the power supply. However, circuit 100 comprises an integrated start-up circuit including high-side switch 102, comprising a high-voltage power switch and a high-voltage start-up switch, thereby substantially reducing cost and complexity of circuit 100.

Figure 2:
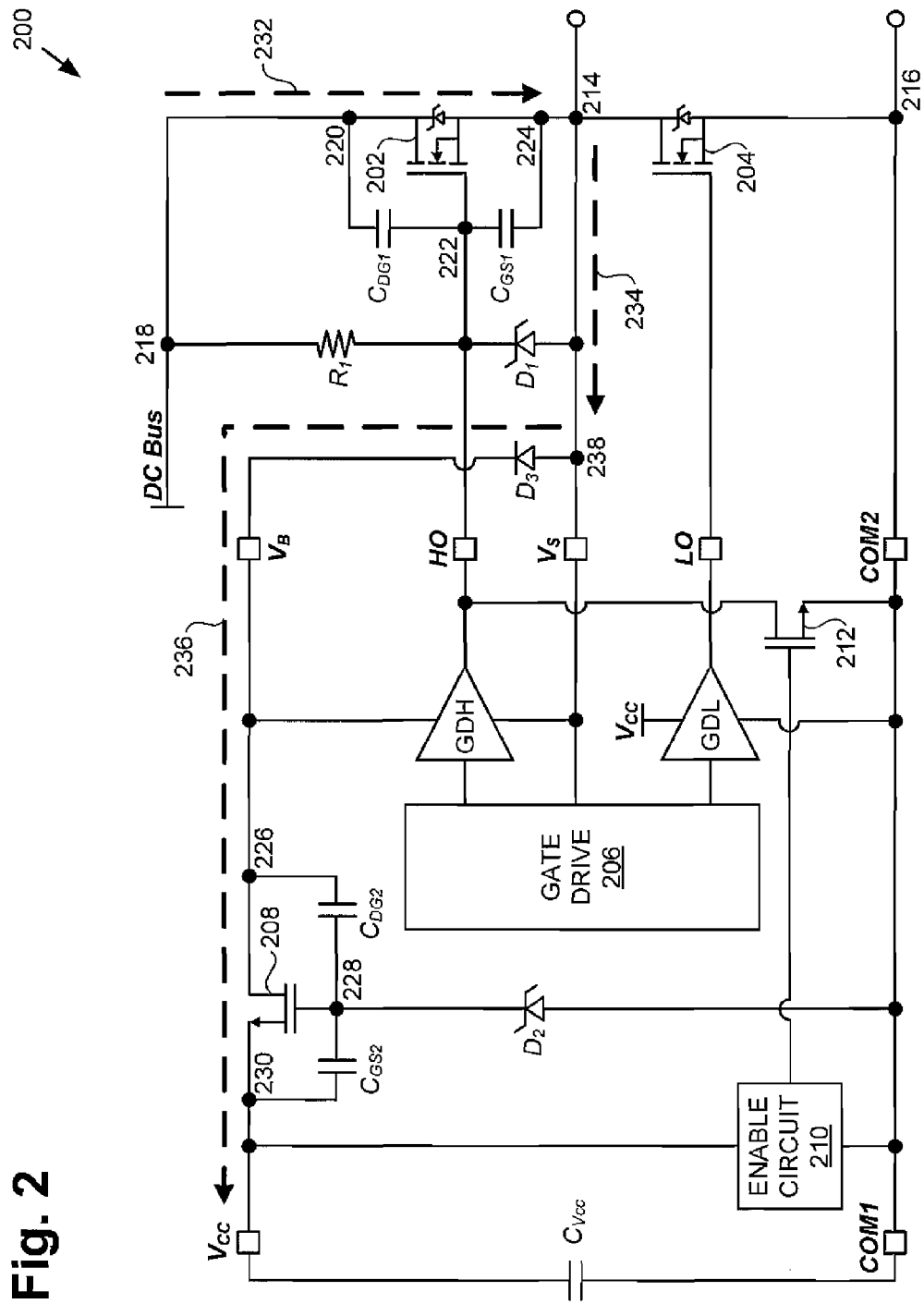
FIG. 2 illustrates a current path during start-up of a high-voltage power supply, according to one embodiment of the invention.

Referring now to FIG. 2, FIG. 2 illustrates a current path during start-up of a high-voltage power supply. FIG. 2 shows circuit 200 corresponding to circuit 100 in FIG. 1. For example, circuit 200 includes high-side switch 202, low-side switch 204, high-side gate driver GDH, low-side gate driver GDL, gate drive 206, bootstrap switch 208, enable circuit 210, enable switch 212, capacitor $C_{Vcc}$, resistor $R_1$, Zener diodes $D_1$ and $D_2$, and Schottky diode $D_3$ corresponding respectively to high-side switch 102, low-side switch 104, high-side gate driver GDH, low-side gate driver GDL, gate drive 106, bootstrap switch 108, enable circuit 110, enable switch 112, capacitor $C_{Vcc}$, resistor $R_1$, Zener diodes $D_1$ and $D_2$, and Schottky diode $D_3$ in FIG. 1.

FIG. 2 further shows $C_{GS1}$ and $C_{DG1}$, which represent internal capacitances of high-side switch 202. For example, $C_{DG1}$ represents the drain to gate capacitance of high-side switch 202 across drain node 220 and gate node 222. $C_{GS1}$ represents the gate to source capacitance of high-side switch 202 across gate node 222 and source node 224. Similarly, FIG. 2 shows $C_{DG2}$ representing the drain to gate capacitance of bootstrap switch 208 across drain node 226 and gate node 228. $C_{GS2}$ represents the gate to source capacitance of bootstrap switch 208 across gate node 228 and source node 230.

FIG. 2 illustrates a path for current during start-up of circuit 200 to provide a start-up voltage to power start-up of circuit 200, which is indicated by directed lines 232, 234, and 236. As described previously, high-side switch 202 comprises a power switch in circuit 200. High-side switch 202 further comprises a high-voltage start-up switch. Prior to and during start-up of circuit 200, high-side gate driver GDH is in a tri-state or high impedance mode allowing gate node 222 of high-side switch 202 to float. Thus, during start-up, voltage at DC Bus node 218, and thus drain node 220 will begin to rise. As gate node 222 is floating, gate node 222 will reach the threshold voltage of high-side switch 202 due to the capacitive divider formed by $C_{DG1}$ and $C_{GS1}$. Thus, high-side switch 202 will self turn-ON and conduct current between DC Bus node 218 and switching node 214 as indicated by directed line 232. As an example, high-side switch 202 can turn ON when DC Bus node 218 is around 20-30 volts.

Circuit 200 can optionally include resistor $R_1$ and Zener diode $D_1$ to ensure that high-side switch 202 turns ON, for example, in the event of current leakage into node HO. FIG. 2 shows resistor $R_1$ coupled to DC Bus node 218 and gate node 222 and Zener diode $D_1$ coupled to gate node 222 and source node 224.

Low-side gate driver GDL is holding the gate of low-side switch 204 low, and thus low-side switch 204 is OFF and current can flow between nodes 214 and 238 as indicated by directed line 234. Furthermore, because circuit 200 includes Schottky diode $D_3$, which is coupled across node $V_B$ and node 238, current can flow between node 238 and drain node 226 when Schottky diode $D_3$ becomes forward biased.

Subsequently, similar to high-side switch 202, bootstrap switch 208 will self turn-ON. For example, gate node 228 will reach the threshold voltage of bootstrap switch 208 due to the capacitive divider formed by $C_{DG2}$ and $C_{GS2}$. Thus, current can flow between node 238 and node $V_{cc}$ as indicated by directed line 236 thereby providing a start-up voltage to node $V_{cc}$, which can power circuit 100 during start-up.

Typically, upon start-up, low-side switch 204 is turned ON by gate drive 206. Thus, high-side switch 202 should be disabled to prevent shoot-through. In one embodiment, at a particular threshold voltage at node $V_{cc}$, enable circuit 210 will send a pulse out to the gate of enable switch 212 to turn enable switch 212 ON. As a result, node HO will be pulled down briefly to turn OFF high-side switch 202. Thus, voltage will no longer be provided to node 226 and bootstrap switch 208 will turn OFF. In some embodiments, circuit 200 can include Zener diode $D_2$, which can protect circuit 200 by causing bootstrap switch 208 to turn OFF in the event that high-side switch 202 is not turned OFF in time to prevent excessive voltages. More particularly, Zener diode $D_2$ can limit the gate voltage of bootstrap switch 208 such that bootstrap switch 208 turns OFF as the voltage at source node 230 continues to rise. Subsequently, circuit 200 can perform regular operation as a buck converter.

Figure 3:
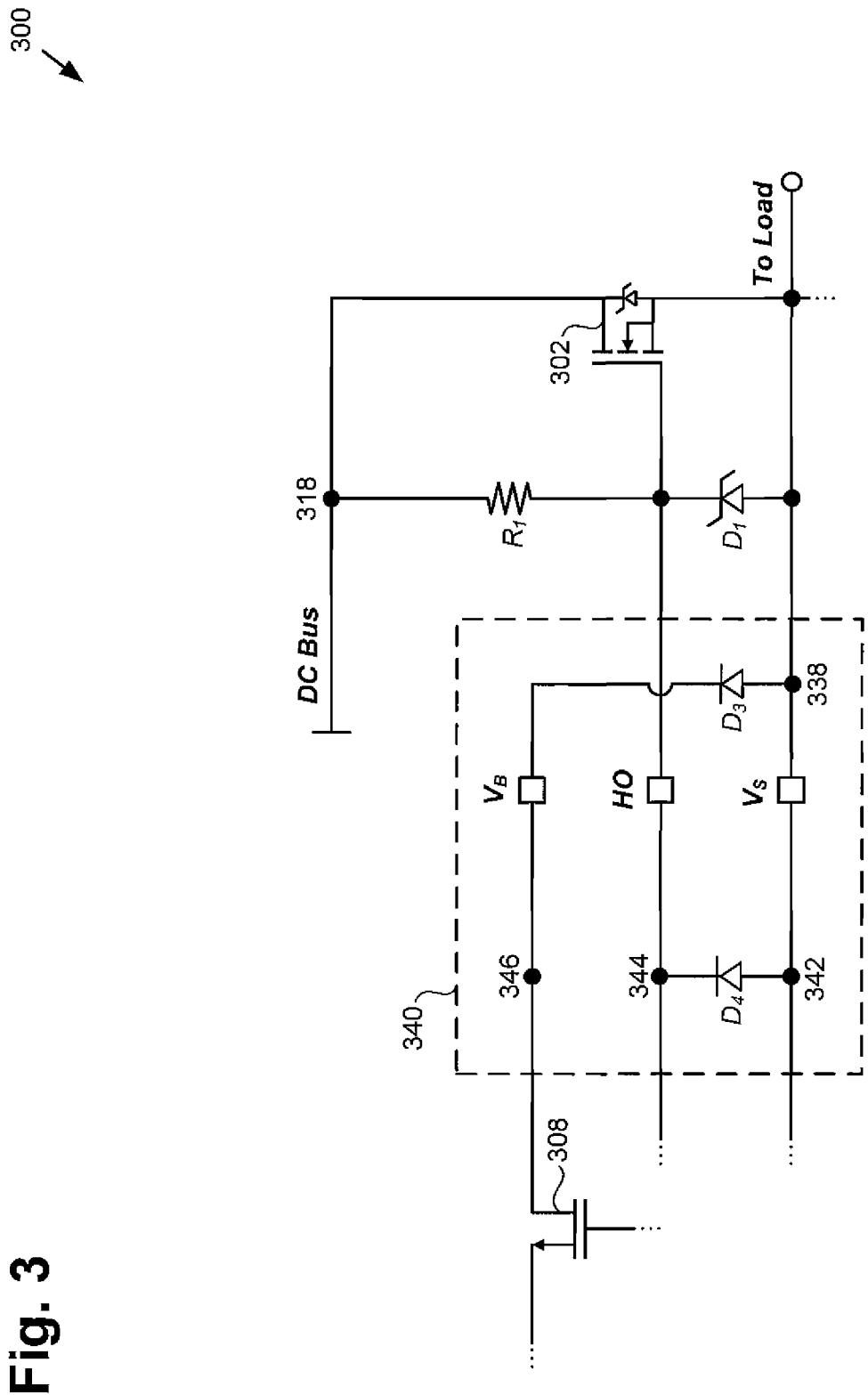
FIG. 3 illustrates an exemplary integrated high-voltage power supply start-up circuit, according to one embodiment of the invention.

Referring now to FIG. 3, FIG. 3 illustrates an exemplary integrated high-voltage power supply start-up circuit, according to one embodiment of the invention. FIG. 3 shows circuit 300 corresponding to circuit 100 in FIG. 1 and circuit 200 in FIG. 2. For example, circuit 300 includes high-side switch 302, bootstrap switch 308, resistor $R_1$, Zener diode $D_1$, and Schottky diode $D_3$ corresponding respectively to high-side switch 102, bootstrap switch 108, resistor $R_1$, Zener diode $D_1$, and Schottky diode $D_3$ in FIG. 1 and high-side switch 202, bootstrap switch 208, resistor $R_1$, Zener diode $D_1$, and Schottky diode $D_3$ in FIG. 2. FIG. 3 also shows electrostatic discharge (ESD) diode $D_4$ and high-voltage well 340 are not shown in FIGS. 1 and 2.

As shown in FIG. 3, nodes $V_B$, HO, and $V_S$ are in high-voltage well 340, thus, voltages at nodes $V_B$, HO, and $V_S$ can float above the start-up voltage during regular operation after start-up of circuit 300.

FIG. 3 further shows ESD diode $D_4$ coupled between nodes 342 and 344 across nodes $V_S$ and HO. Conventional power supplies include an additional ESD diode coupled between nodes 346 and 344 across nodes $V_B$ and HO. However, in the present embodiment, because node HO can float during start-up as described above, an ESD diode coupled across nodes 346 and 344 would immediately provide a high-voltage at node $V_B$ even when high-side switch 302 is OFF, thereby damaging circuit 300. Thus, circuit 300 includes Schottky diode $D_3$, which is coupled across node 338 and node $V_B$ to provide a low voltage drop and a current path from DC Bus node 318 to node $V_B$, and thus bootstrap switch 308, when high-side switch 302 is ON.

Thus, as discussed above with respect to FIGS. 1 through 3, the present invention provides an integrated start-up circuit including a high-voltage switch, which comprises a power switch and a start-up switch. In one embodiment, the high-voltage switch comprises a high-side switch in a buck converter. The high-side switch can provide a start-up voltage for a power supply through a Schottky diode and a bootstrap switch where the high-voltage switch and bootstrap switch are also used during regular operation of the power supply after start-up. Thus, various embodiments of the present invention can provide start-up circuitry for power supplies without a specialized high-voltage start-up switch and other complex start-up circuitry.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

The invention claimed is:

1. An integrated start-up circuit comprising:
   a gate driver configured to drive a power switch, said power switch coupled across a DC bus node and a switching node of a buck converter;
   said power switch configured to self turn ON to provide a start-up voltage to said buck converter from said DC bus node, while another power switch of said buck converter configured to remain OFF, during start-up of said buck converter.

2. The integrated start-up circuit of claim 1, wherein said gate driver is configured to float a gate of said power switch during said start-up of said buck converter.

3. The integrated start-up circuit of claim 1, wherein said buck converter comprises a bootstrap switch coupled across said gate driver and a Vcc node, said start-up voltage provided at said Vcc node.

4. The integrated start-up circuit of claim 3, comprising a Schottky diode coupled across said bootstrap switch and said switching node.

5. The integrated start-up circuit of claim 1, comprising an enable circuit configured to provide a pulse to disable said power switch upon said start-up of said buck converter.

6. The integrated start-up circuit of claim 1, comprising an enable circuit configured to disable said power switch upon said start-up of said buck converter.

7. The integrated start-up circuit of claim 1, wherein said power switch comprises an NMOS transistor.

8. The integrated start-up circuit of claim 1, wherein said power switch comprises a group III-V transistor.

9. An integrated start-up circuit for a power supply comprising:
   a gate driver configured to drive a power switch, said power switch coupled across a DC bus node and a switching node of said power supply;
   a bootstrap switch coupled across said gate driver and a Vcc node;
   said power switch configured to provide a start-up voltage from said DC bus node to said Vcc node through said bootstrap switch.

10. The integrated start-up circuit of claim 9, wherein said gate driver is configured to float a gate of said power switch during said start-up of said power supply.

11. The integrated start-up circuit of claim 9, comprising a Schottky diode coupled across said bootstrap switch and said switching node.

12. The integrated start-up circuit of claim 9, comprising an enable circuit configured to disable said power switch upon said start-up of said power supply.

13. The integrated start-up circuit of claim 9, comprising an enable circuit configured to provide a pulse to disable said power switch upon said start-up of said power supply.

14. The integrated start-up circuit of claim 9, wherein said power switch comprises an NMOS transistor.

15. The integrated start-up circuit of claim 9, wherein said power switch comprises a group III-V transistor.

16. The integrated start-up circuit of claim 9, comprising a Zener diode coupled to the gate of said bootstrap switch and configured to limit the gate voltage of said bootstrap switch.

\* \* \* \* \*